United States Patent
Li et al.

(10) Patent No.: US 10,941,459 B2
(45) Date of Patent: *Mar. 9, 2021

(54) 600 MPA YIELD STRENGTH-GRADED, HIGH-STRETCHABILITY HOT-DIP ALUMINUM-ZINC AND COLOR-COATED STEEL PLATE AND MANUFACTURING METHOD THEREFOR

(71) Applicant: BAOSHAN IRON & STEEL CO., LTD., Shanghai (CN)

(72) Inventors: Jun Li, Shanghai (CN); Dechao Xu, Shanghai (CN); Hailing Mu, Shanghai (CN); Yusheng Zhao, Shanghai (CN); Yun-feng Liu, Shanghai (CN)

(73) Assignee: Baoshan Iron & Steel Co., Ltd., Shanghai (CN)

( * ) Notice: Subject to any disclaimer, the term of this patent is extended or adjusted under 35 U.S.C. 154(b) by 209 days.

This patent is subject to a terminal disclaimer.

(21) Appl. No.: 15/754,659

(22) PCT Filed: Jul. 25, 2016

(86) PCT No.: PCT/CN2016/091500
§ 371 (c)(1),
(2) Date: Feb. 23, 2018

(87) PCT Pub. No.: WO2017/036261
PCT Pub. Date: Mar. 9, 2017

(65) Prior Publication Data
US 2018/0245176 A1    Aug. 30, 2018

(30) Foreign Application Priority Data
Aug. 28, 2015  (CN) .......................... 201510540657.1

(51) Int. Cl.
*B32B 15/01* (2006.01)
*C22C 38/14* (2006.01)
(Continued)

(52) U.S. Cl.
CPC .............. *C21D 9/46* (2013.01); *B32B 15/012* (2013.01); *B32B 15/013* (2013.01); *B32B 15/04* (2013.01);
(Continued)

(58) Field of Classification Search
CPC ... C21D 1/52; C21D 9/46; C21D 9/48; C21D 8/0273; C21D 8/0473; C21D 8/0205;
(Continued)

(56) References Cited

U.S. PATENT DOCUMENTS

2002/0114884 A1* 8/2002 Friedersdorf ............ B05D 7/14
427/195
2004/0161629 A1* 8/2004 McDevitt .................. C23C 2/12
428/653
(Continued)

FOREIGN PATENT DOCUMENTS

| CN | 102363857 | | 2/2012 |
| CN | 102703810 | A | 10/2012 |

(Continued)

OTHER PUBLICATIONS

Arcelor/Mittal Solutions in Steel for Construction, "Galvalume: The Steel Product of Choice for Superior Corrosion Resistance," Oct. 2016 (pp. 4, 5, and 9). (Year: 2016).*
(Continued)

*Primary Examiner* — Michael E. La Villa
(74) *Attorney, Agent, or Firm* — Thomas Horstemeyer, LLP (57) ABSTRACT

An aluminium-zinc-hot-dipped and colour-coated steel plate having a 600 MPa yield strength grade and a high elongation
(Continued)

and a manufacturing method thereof, with the chemical components in mass percentage of a substrate of the steel plate being: 0.07-0.15% of C, 0.02-0.5% of Si, 1.3-1.8% of Mn, N≤0.004%, S≤0.01%, Ti≤0.20%, Nb≤0.060%, and the balance being Fe and other inevitable impurities, and meanwhile satisfying the conditions of: (C+Mn/6)≥0.3%; Mn/S≥150; Nb satisfying 0.01%≤(Nb−0.22C−1.1N)≤0.06% where no Ti is contained; Ti satisfying 0.5≤Ti/C≤1.5 where no Nb is contained; and 0.04%≤(Ti+Nb)≤0.26% where Ti and Nb are added in combination. The steel plate has a yield strength of ≥600 MPa, a tensile strength of ≥650 MPa, an elongation after fracture of ≥12%, a good strength and toughness and an excellent corrosion resistance.

14 Claims, 1 Drawing Sheet

(51) Int. Cl.

| | |
|---|---|
| *C22C 38/12* | (2006.01) |
| *C22C 38/04* | (2006.01) |
| *C22C 38/02* | (2006.01) |
| *C22C 38/00* | (2006.01) |
| *C23C 2/06* | (2006.01) |
| *C23C 2/12* | (2006.01) |
| *C21D 6/00* | (2006.01) |
| *C21D 9/46* | (2006.01) |
| *C21D 8/02* | (2006.01) |
| *C23C 2/02* | (2006.01) |
| *C22C 18/04* | (2006.01) |
| *C22C 30/06* | (2006.01) |
| *C22C 21/10* | (2006.01) |
| *C22C 38/48* | (2006.01) |
| *C22C 38/28* | (2006.01) |
| *C22C 38/50* | (2006.01) |
| *C22C 38/26* | (2006.01) |
| *C21D 1/26* | (2006.01) |
| *C21D 9/48* | (2006.01) |
| *C21D 1/52* | (2006.01) |
| *C21D 8/04* | (2006.01) |
| *B32B 15/08* | (2006.01) |
| *B32B 15/09* | (2006.01) |
| *B32B 15/20* | (2006.01) |
| *B32B 15/04* | (2006.01) |
| *B32B 15/18* | (2006.01) |
| *C23F 17/00* | (2006.01) |
| *C23C 2/40* | (2006.01) |
| *C23C 2/26* | (2006.01) |
| *C23C 2/28* | (2006.01) |
| *B21B 1/22* | (2006.01) |

(52) U.S. Cl.
CPC ............ *B32B 15/043* (2013.01); *B32B 15/08* (2013.01); *B32B 15/09* (2013.01); *B32B 15/18* (2013.01); *B32B 15/20* (2013.01); *C21D 1/26* (2013.01); *C21D 1/52* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C21D 8/0273* (2013.01); *C21D 8/0278* (2013.01); *C21D 8/0473* (2013.01); *C21D 9/48* (2013.01); *C22C 18/04* (2013.01); *C22C 21/10* (2013.01); *C22C 30/06* (2013.01); *C22C 38/001* (2013.01); *C22C 38/002* (2013.01); *C22C 38/02* (2013.01); *C22C 38/04* (2013.01); *C22C 38/12* (2013.01); *C22C 38/14* (2013.01); *C22C 38/26* (2013.01); *C22C 38/28* (2013.01); *C22C 38/48* (2013.01); *C22C 38/50* (2013.01); *C23C 2/02* (2013.01); *C23C 2/06* (2013.01); *C23C 2/12* (2013.01); *C23C 2/26* (2013.01); *C23C 2/28* (2013.01); *C23C 2/40* (2013.01); *C23F 17/00* (2013.01); *B21B 1/22* (2013.01); *B21B 2001/221* (2013.01); *B21B 2001/225* (2013.01); *B21B 2001/228* (2013.01); *C21D 2211/002* (2013.01); *C21D 2211/003* (2013.01); *C21D 2211/004* (2013.01); *C21D 2211/005* (2013.01); *C21D 2211/008* (2013.01); *Y10T 428/12556* (2015.01); *Y10T 428/12562* (2015.01); *Y10T 428/12569* (2015.01); *Y10T 428/12757* (2015.01); *Y10T 428/12799* (2015.01); *Y10T 428/12951* (2015.01); *Y10T 428/12958* (2015.01); *Y10T 428/12965* (2015.01); *Y10T 428/12972* (2015.01); *Y10T 428/12993* (2015.01); *Y10T 428/26* (2015.01)

(58) Field of Classification Search
CPC .. C21D 8/0226; C21D 8/0236; C21D 8/2063; C21D 8/0278; C21D 6/005; C21D 6/008; C21D 2211/004; C21D 2211/002; C21D 2211/005; C21D 2211/008; C21D 2211/003; C21D 8/0263; C21D 1/26; B32B 15/012; B32B 15/013; B32B 15/043; B32B 15/08; B32B 15/18; B32B 15/20; B32B 15/04; B32B 15/09; C23C 2/02; C23C 2/26; C23C 2/28; C23C 2/06; C23C 2/12; C23C 2/40; C22C 38/001; C22C 38/002; C22C 38/04; C22C 38/02; C22C 38/12; C22C 38/14; C22C 38/26; C22C 38/28; C22C 38/48; C22C 38/05; C22C 18/04; C22C 21/10; C22C 30/06; C22C 38/50; C23F 17/00; Y10T 428/12556; Y10T 428/12562; Y10T 428/12569; Y10T 428/12757; Y10T 428/12799; Y10T 428/12951; Y10T 428/12958; Y10T 428/12965; Y10T 428/12993; Y10T 428/12972; Y10T 428/26; B21B 1/22; B21B 2001/221; B21B 2001/225; B21B 2001/228
See application file for complete search history.

(56) References Cited

U.S. PATENT DOCUMENTS

| | | | |
|---|---|---|---|
| 2012/0031528 A1* | 2/2012 | Hayashi | C21D 8/0205 148/269 |
| 2015/0047752 A1 | 2/2015 | Liu et al. | |
| 2018/0245175 A1* | 8/2018 | Li | C21D 1/52 |

FOREIGN PATENT DOCUMENTS

| | | |
|---|---|---|
| CN | 104264041 | 1/2015 |
| CN | 104294151 | 1/2015 |
| CN | 104831207 | 8/2015 |
| CN | 105063484 A | 11/2015 |
| JP | H0394018 | 4/1991 |
| JP | 2003511559 | 3/2003 |
| JP | 2007015000 | 1/2007 |
| JP | 2018532043 | 11/2018 |
| KR | 20130023712 | 3/2013 |
| RU | 2312162 | 12/2007 |

(56) References Cited

FOREIGN PATENT DOCUMENTS

| WO | 2010137317 | 12/2010 |
|----|------------|---------|
| WO | 2013046693 A1 | 4/2013 |

OTHER PUBLICATIONS

PCT/CN2016/091500 International Search Report and Written Opinion, dated Nov. 24, 2016; PCT/CN2016/091500 PCT Request dated Jul. 25, 2016 and PCT Notification.
Japanese Office Action dated Feb. 19, 2019 for JP Patent Application No. 2018-511042.
Office Action dated Jan. 24, 2020 for Russian Patent Application No. 2018112070.
Japanese Office Action dated Jun. 30, 2020 for JP Patent Application No. 2018-511042.

\* cited by examiner

600 MPA YIELD STRENGTH-GRADED, HIGH-STRETCHABILITY HOT-DIP ALUMINUM-ZINC AND COLOR-COATED STEEL PLATE AND MANUFACTURING METHOD THEREFOR

CROSS-REFERENCE TO RELATED APPLICATIONS

This application is a 371 U.S. National Phase of PCT International Application No. PCT/CN2016/091500, filed on Jul. 25, 2016, which claims benefit and priority to Chinese patent application No. 201510540657.1, filed on Aug. 28, 2015. Both of the above-referenced applications are incorporated by reference herein in their entirety.

TECHNICAL FIELD

The present invention belongs to the technical field of the production of cold-rolled plates and relates to an aluminium-zinc-hot-dipped colour-coated steel plate having a yield strength grade of ≥600 MPa and a high elongation and a manufacturing method for the aluminium-zinc-hot-dipped and colour-coated steel plate.

BACKGROUND ART

Colour-coated plates in China are mainly used in the construction field, in which profiled housing wall sheets require a high strength, a good toughness and an excellent corrosion resistance. Many Chinese users (especially users in the construction industry) need colour-coated plates for structural use to, without loss of elongation, improve the strength of a structural member and reduce the weight, achieving a high strength, a reduced thickness and a reduced cost. Among aluminium-zinc-hot-dipped steel plates produced in China at present, products having a higher yield strength and higher tensile strength all have a low elongation due to the limitation of process conditions, and in cases where the plasticity requirements are higher, these may not satisfy the requirements, which greatly limits the application and promotion of aluminium-zinc-hot-dipped steel plates.

At present, such steel plates with an excellent performance are mainly prepared by the control of the composition of a substrate and the production process. A choice of the addition of simply Ti, simply Nb or Ti and Nb in combination can be made for composition design to achieve the expected performance goals; however, considering the cost economy and performance stability, the types and proportions of the added alloys are the key factors that determine the product cost, the material performance stability and the material manufacturability.

Chinese patent CN 102363857 B discloses a method for producing a 550 MPa-yield strength colour-coated plate for structural use, wherein Ti and Nb involved in the plate are at most 0.005% and 0.0045%, respectively, the yield strength RP0.2 reaches 550-600 MPa, the tensile strength Rm is 560-610 MPa, and the elongation after fracture $A_{80}$ mm is ≥6%. The strengthening method for the plate mainly relates to retaining most of deformed banded structures, which have not been recrystallized, by means of a low-temperature annealing process to increase the strength, resulting in the elongation after fracture being merely 6% and poorer plasticity. Different from the metallographic structure of the present invention, the steel plate has different mechanical properties.

Chinese patent CN 100529141 C discloses a full-hard aluminium-zinc-dipped steel plate and a production method for the full-hard aluminium-zinc-dipped steel plate, wherein the steel plate provided by the method has a yield strength reaching 600 MPa or higher, an elongation at fracture of ≤7% and a total content of Ti and Nb of 0.015-0.100%, and the annealing temperature is controlled at 630-710° C. to obtain the full-hard steel plate; however, the plasticity of the full-hard steel plate cannot meet the processing requirements for formability. The requirements of a yield strength of ≥600 MPa, a tensile strength of ≥650 MPa and an elongation after fracture of ≥12% cannot be met.

Chinese patent CN 200710093976.8 discloses an aluminium-zinc-hot-dipped steel plate for deep drawing and a production method for the aluminium-zinc-hot-dipped steel plate, wherein an IF steel substrate is used to produce the aluminium-zinc-hot-dipped product, and the substrate has ≤0.01% of a component C, a yield strength of 140-220 MPa, a tensile strength reaching 260-350 MPa and an elongation of greater than 30%; however, the product cannot meet the requirements of a yield strength of ≥600 MPa and a tensile strength of ≥650 MPa.

Chinese patent CN 103911551 A discloses an aluminium-zinc-hot-dipped steel plate and a preparation method for the aluminium-zinc-hot-dipped steel plate, and products with a yield strength of 250-310 MPa, a tensile strength of 300-380 MPa and an elongation of ≥30% can be prepared, but the strength grade of the steel plate is low.

A low-alloy aluminium-zinc-hot-dipped steel plate invented in Chinese Patent CN 104264041 A has a yield strength of 410-570 MPa, a tensile strength of ≥470 MPa and an elongation of ≥15%. The soaking time of the process for the steel plate is 40-120 s, which soaking time is too long, leading to grain coarsening, a lower strength grade and a failure of reaching the requirements of a yield strength of ≥600 MPa, a tensile strength of ≥650 MPa and an elongation after fracture of ≥12%.

At present, there is a great demand for aluminium-zinc-dipped and colour-coated products in the fields such as the steel structure construction industry with the requirements of a high wind uplift resistance, a high corrosion resistance, a high strength and a high elongation. However, high-strength low-alloy aluminium-zinc-hot-dipped and colour-coated products with a yield strength of ≥600 MPa, a tensile strength of ≥650 MPa and an elongation of ≥12% are all blank all over the world.

SUMMARY OF THE INVENTION

An object of the present invention is to provide an aluminium-zinc-hot-dipped and colour-coated steel plate having a 600 MPa yield strength grade and a high elongation and a manufacturing method for the aluminium-zinc-hot-dipped and colour-coated steel plate having a 600 MPa yield strength grade and a high elongation, wherein the steel plate has excellent mechanical properties, i.e., a yield strength of ≥600 MPa, a tensile strength of ≥650 MPa and an elongation after fracture of ≥12%, the dipping layer is uniform and dense, and the product has not only a good toughness but also an excellent corrosion resistance, and can meet the requirements of high yield strength and high elongation for constructions, automobiles etc. The product can also be used for the electrical devices of home appliances, elevators etc., achieving a high strength and a reduced thickness.

In order to achieve the above-mentioned object, the technical solution of the present invention is an aluminium-zinc-hot-dipped and colour-coated steel plate having a 600 MPa yield strength grade and a high elongation, with the chemical components in mass percentage of a substrate of the steel plate being: 0.07-0.15% of C, 0.02-0.5% of Si, 1.3-1.8% of Mn, N≤0.004%, S≤0.01%, Ti≤0.20%, Nb≤0.060%, and the balance being Fe and other inevitable impurities, and meanwhile satisfying the conditions of:

(C+Mn/6)≥0.3%;

Mn/S≥150;

Nb satisfying 0.01%≤(Nb−0.22C−1.1N)≤0.06% where no Ti is contained;

Ti satisfying 0.5≤Ti/C≤1.5 where no Nb is contained; and 0.04%≤(Ti+Nb)≤0.26% where Ti and Nb are added in combination.

The microstructure of the steel plate of the present invention is a complex phase structure comprising at least one structure of ferrite, cementite, fine precipitates, bainite, martensite and deformed banded grains. The steel plate of the present invention has a yield strength of ≥600 MPa, a tensile strength of ≥650 MPa and an elongation after fracture of ≥12%.

The surface of the aluminium-zinc-hot-dipped steel plate has fine, uniform silver-white spangles, and the grain diameter of the spangles is less than 10 mm, preferably less than 5 mm.

A coating layer coated on the surface of the colour-coated steel plate is classified as a fluorocarbon, a polyester (PE), a silicon-modified polyester (SMP), a highly weather resistant polyester (HDP) or a polyvinylidene fluoride (PVDF) according to coating types.

In the composition design of the present invention:

C and Si in the steel substrate of the present invention are the most effective and cheapest solid solution strengthening elements, and the solid solution strengthening effect increases as the contents of C and Si increase. However, Si can be enriched at the surface of the steel strip and is enriched more significantly than the C element, which seriously affects the wetting behaviour of the steel strip, so the content of Si needs to be strictly controlled.

In the present invention, a trace amount of alloying element Nb is added, which element can form precipitates such as Nb (C, N) in the steel. In the addition of simply Nb in the present invention, where the composition design satisfies the equation 0.01%≤(Nb−0.22C−1.1N)≤0.06%, Nb and C, N form a sufficient and fine intermediate phase, achieving a material strengthening effect.

In the present invention, a trace amount of alloying element Ti is added, which element can form precipitates such as TiC and TiN in the steel. In the addition of simply Ti in the present invention, the composition design is 0.5≤Ti/C≤1.5, which can result in the formation of a large amount of special carbide TiC which is a good dispersion strengthening enhancer.

In the present invention, where a trace amount of alloying element of Ti and a trace amount of alloying element of Nb are added in combination, fine precipitates having strengthening effects, such as Nb (C, N), TiC, TiN and (Ti, Nb)(C, N), can be formed to strengthen the substrate.

In the present invention, Mn element is added, which element can, during cooling, reduce the phase change temperature, refine the ferrite grains, increase the interval of the recrystallization finish temperature and the phase change start temperature, increase the hardenability of the steel and allow for a bainite or martensite transformation during the cooling after hot-dipping. The C equivalent in a carbon steel determines the strength properties, and the strength of the material is simply expressed as a carbon equivalent by means of the statistics of a large number of test data; therefore, (C+Mn/6)≥0.3% is required in the present invention. In addition, Mn in molten steel can be infinitely miscible, and Mn mainly has a solid solution strengthening effect; since a certain amount of S element remains in the molten steel, which element has the negative effects of increasing the hot brittleness of the slab, deteriorating the mechanical properties of the steel, etc., the Mn/S value of the steel plate has to be increased in order to reduce the negative effects of S, and therefore the content of Mn is controlled to be Mn/S≥150 in the present invention, so that the negative effects of S can be effectively reduced.

In the present invention, after the addition of Ti or Nb, a large amount of fine precipitates is dispersed in the substrate to strengthen the substrate. The addition of Mn element expands the austenite zone and improves the hardenability of the steel plate, and in conjunction with a post-dipping rapid cooling technique, some bainite or martensite strengthened phases can be obtained.

The method for manufacturing the aluminium-zinc-hot-dipped and colour-coated steel plate having a 600 MPa yield strength grade of the present invention comprises the steps of:

1) smelting and casting smelting and casting the components above to obtain a cast slab;

2) hot-rolling and pickling wherein the heating tapping temperature is 1150-1280° C., the finish rolling temperature of the hot rolling is 800-900° C. and the hot rolling coiling temperature is 500-650° C.; and the cooling method after the hot rolling is water cooling;

3) cold rolling;

cold-rolling to form a steel strip with a rolling reduction of 60-80%;

4) continuous annealing performing continuous annealing in a non-oxidation continuous annealing aluminium-zinc-hot-dipping furnace comprising a direct-fired heating section, a radiant tube heating section, a soaking section, a cooling section before hot-dipping, a hot tension roller zone and a hot-dipping section, and cooling after hot-dipping, wherein the duration in the direct-fired heating section is 20-60 s, with the heating temperature being 650-710° C.; the duration in the radiant tube heating section is 30-60 s, with the heating temperature being 750-840° C.; the duration in the temperature holding section is 1-10 s, with the soaking temperature being 750-840° C.; the duration in an cooling after hot-dipping section is 8-15 s; the duration in the hot tension roller zone and the hot-dipping section is 8-12 s; and the post-hot-dipping cooling rate is ≥20° C./s;

5) hot-dipping dipping the steel strip in a zinc pot for a hot-dipping treatment to obtain a high-strength low-alloy aluminium-zinc-hot-dipped steel strip, with the components in weight percentage of the hot-dipping liquid being: 48-58% of Al, 40-50% of Zn, 1.0-2.0% of Si, 0.005-0.050% of Ti and the balance being inevitable impurities and the zinc pot temperature being 550-610° C.; and 6) skin pass rolling and withdrawing-straightening the temper rolling ratio being 0.25%±0.2 and the withdrawing-straightening ratio being 0.2%±0.2.

Furthermore, the method further comprises step 7): colour-coating, wherein a coating layer coated on the surface of the colour-coated steel plate is classified as a fluorocarbon, a polyester (PE), a silicon-modified polyester (SMP), a highly weather resistant polyester (HDP) or a polyvinylidene fluoride (PVDF).

Preferably, gas jet cooling or gas-mist jet cooling is used for the cooling after hot-dipping in step 4).

The microstructure of the steel plate of the present invention is a complex phase structure comprising at least one structure of ferrite, cementite, fine precipitates, bainite, martensite and deformed banded grains. The steel plate of the present invention has a yield strength of ≥600 MPa, a tensile strength of ≥650 MPa and an elongation after fracture of ≥12%.

The surface of the aluminium-zinc-hot-dipped steel plate of the present invention has fine, uniform silver-white spangles. After being colour-coated, the surface does not have the defects of bubbles, cracks, holidays, etc., which are harmful to use.

In the manufacturing method of the present invention, direct-flame rapid heating, short-term temperature holding, and rapid cooling methods are used in the present invention to achieve a rapid heat treatment, refining the structure and improving the strength and elongation. A method of gas jet cooling or gas-mist jet cooling is used for the cooling after hot-dipping, so that grain refinement can be achieved to obtain a strengthened phase.

Direct flame heating is used in the present invention, which improves the heating rate while shortening the temperature holding time to 1-10 s, inhibiting the grain growth, so that a rapid heat treatment can be achieved for grain refinement.

In the process of annealing aluminium-zinc-hot-dipping, fine precipitates have an effect of dislocation pinning and a hindering effect on subgrain boundary migration, inhibiting the growth of recrystallized grains and refining the grains, increasing the yield strength and tensile strength of the steel, thus achieving the purpose of strengthening the material while maintaining a good plasticity. A post-dipping rapid cooling is carried out by means of gas jet cooling or gas-mist jet cooling to refine grains and obtain a strengthened phase. The gas-mist jet cooling refers to adding a water mist of fine droplets to a protecting gas for gas jet cooling, and then jetting same to the surface of the strip steel at a certain angle and speed, so that the efficiency of heat exchange on the surface of the strip steel is greatly increased. Direct-flame rapid heating, short-term temperature holding, and rapid cooling methods are used in the present invention to achieve a rapid heat treatment, refining the structure and improving the strength and elongation.

The overall cold-rolling reduction rate is controlled to 60-80%. Given an appropriate composition and a hot-rolling process, it is impossible to obtain a desired metallographic structure unless an appropriate cold-rolling reduction is ensured. When the cold-rolling reduction is lower, the deformation energy storage is small, and recrystallization is not easy to occur during the subsequent recrystallization; a certain amount of cold-rolled structure can be appropriately retained to improve the strength.

The continuous annealing is carried out in a non-oxidation continuous annealing aluminium-zinc-hot-dipping furnace comprising a direct-fired heating section, a radiant tube heating section, a soaking section, a cooling section before hot-dipping, a hot tension roller zone and a hot-dipping section, and gas jet cooling or gas-mist jet cooling is carried out after the hot-dipping. The duration in the direct-fired heating section is 20-60 s, with the heating temperature being 650-710° C.; the duration in the radiant tube heating section is 30-60 s, with the heating temperature being 750-840° C.; the duration in the temperature holding section is 1-10 s, with the soaking temperature being 750-840° C.; the duration in the cooling after hot-dipping section is 8-15 s; and the duration in the hot tension roller zone and the hot-dipping section is 8-12 s.

Direct flame heating is used in the present invention, which improves the heating rate while shortening the temperature holding time to 1-10 s, inhibiting the grain growth, so that a rapid heat treatment can be achieved for grain refinement. Due to the addition of an alloy, the high-strength low-alloy steel is quite sensitive to the annealing temperature, so the temperature and holding time in each section of the annealing section should be strictly controlled.

Upon testing after practical production, the aluminium-zinc-hot-dipped and colour-coated steel plate having a 600 MPa grade and a high elongation of the present invention has a yield strength of 600-650 MPa, a tensile strength of ≥700 MPa and an elongation at break of ≥12%. After aluminium-zinc-hot-dipping, the substrate is a uniform complex phase structure of ferrite+cementite+bainite+martensite+deformed banded grains+fine precipitates, and the surface of the steel plate has fine, uniform silver-white spangles. After being colour-coated, the surface does not have the defects of bubbles, cracks, holidays, etc., which are harmful to use.

Compared with the prior art, the present invention does not need any equipment transformation, has a simple manufacturing process and can manufacture an aluminium-zinc-hot-dipped product having not only a high corrosion resistance and heat resistance but also an excellent toughness, and the product of the present invention has a high strength and a good plasticity; furthermore, the dipping layer is uniform, dense and appropriate in thickness, and after optional colour-coating, a good glossiness is present, so that the product can be widely used in the industry of constructions, home appliances, etc., expanding a broad area for the application of aluminium-zinc-dipped products.

DETAILED DESCRIPTION OF EMBODIMENTS

The present invention is further described in detail in conjunction with the accompanying drawings and examples.

Table 1 relates to the chemical compositions of the steel substrate of the steel strip and dipping layers of the examples of the present invention, with the balances being Fe and inevitable impurities.

Table 2 relates to the hot-rolling and cold-rolling process conditions of the examples of the present invention, and Table 3 relates to the continuous annealing process conditions of the examples of the present invention.

Table 4 relates to the mechanical properties of the steel plates of the examples of the present invention.

TABLE 1

| | Percentage by weight (wt %) | | | | | | | | | | |
|---|---|---|---|---|---|---|---|---|---|---|---|
| | Steel substrate composition | | | | | | | Dipping layer composition | | | |
| | C | Si | Mn | N | S | Ti | Nb | Al | Zn | Si | Ti |
| Example 1 | 0.12 | 0.075 | 1.5 | 0.0015 | 0.008 | 0.001 | 0.045 | 48 | 50 | 1 | 0.01 |
| Example 2 | 0.08 | 0.05 | 1.7 | 0.0018 | 0.006 | 0.001 | 0.045 | 54 | 44 | 1 | 0.01 |
| Example 3 | 0.15 | 0.3 | 1.4 | 0.0031 | 0.01 | 0.087 | 0.011 | 52 | 45 | 2 | 0.05 |
| Example 4 | 0.10 | 0.2 | 1.6 | 0.001 | 0.009 | 0.17 | 0.001 | 51 | 47 | 1 | 0.02 |
| Example 5 | 0.13 | 0.09 | 1.5 | 0.004 | 0.008 | 0.001 | 0.051 | 52 | 46 | 1 | 0.03 |
| Example 6 | 0.12 | 0.09 | 1.5 | 0.004 | 0.008 | 0.04 | 0.035 | 51 | 47 | 1 | 0.03 |

TABLE 2

| | Heating tapping temperature/° C. | Finish rolling temperature of hot rolling/° C. | Coiling temperature/° C. | Cold rolling reduction/% |
|---|---|---|---|---|
| Example 1 | 1230 | 860 | 550 | 80 |
| Example 2 | 1220 | 850 | 600 | 62 |
| Example 3 | 1260 | 880 | 650 | 71 |
| Example 4 | 1170 | 890 | 630 | 66 |
| Example 5 | 1190 | 840 | 590 | 70 |
| Example 6 | 1160 | 810 | 510 | 72 |

TABLE 3

| | Temperature in direct-fired section/° C. | Duration in direct-fired section/s | Temperature in radiant heating section/° C. | Duration in radiant section/s | Holding temperature/° C. | Holding time/s | Cooling rate of the cooling after hot-dipping rate/° C. s |
|---|---|---|---|---|---|---|---|
| Example 1 | 660 | 28 | 770 | 38 | 770 | 3 | 30 |
| Example 2 | 700 | 32 | 820 | 44 | 820 | 4 | 25 |
| Example 3 | 680 | 31 | 780 | 42 | 780 | 4 | 31 |
| Example 4 | 680 | 31 | 835 | 42 | 835 | 4 | 31 |
| Example 5 | 680 | 46 | 760 | 48 | 760 | 7 | 31 |
| Example 6 | 680 | 31 | 780 | 42 | 780 | 3 | 31 |

TABLE 4

| | Yield strength/ MPa | Tensile strength/ MPa | Elongation/ % | Thickness/ mm |
|---|---|---|---|---|
| Example 1 | 640 | 678 | 13.5 | 0.6 |
| Example 2 | 627 | 711 | 13.5 | 0.8 |
| Example 3 | 619 | 702 | 13.4 | 0.75 |
| Example 4 | 623 | 708 | 14.5 | 0.7 |
| Example 5 | 641 | 685 | 13.2 | 0.65 |
| Example 6 | 611 | 680 | 14.2 | 0.7 |

Example 1

This example relates to a method for manufacturing an aluminium-zinc-hot-dipped and colour-coated steel plate having a 600 MPa yield strength grade and a high elongation, with the steel plate having a thickness of 0.6 mm after being colour-coated, the method comprising the steps of:

1) smelting: performing molten iron desulphurization, converter smelting and casting to obtain a cast slab having chemical components in weight percentage: 0.12% of C, 0.075% of Si, 1.5% of Mn, 0.0015% of N, 0.008% of S, 0.001% of Ti, 0.045% of Nb, and the balance being Fe and other inevitable impurities;

2) hot-rolling and pickling
wherein the heating tapping temperature is 1230° C., the finish rolling temperature of hot rolling is 860° C. and the hot rolling coiling temperature is 550° C., wherein water quenching cooling is carried out before coiling, and the hot-rolled plate has a thickness of 2.7 mm;

3) cold-rolling, wherein the overall reduction rate is controlled to 80%, and the cold-rolled plate has a thickness of 0.56 mm;

4) continuous annealing
performing continuous annealing in a non-oxidation continuous annealing furnace comprising a direct-fired heating section, a radiant tube heating section, a soaking treatment and a cooling treatment. The duration in the direct-fired heating section is 28 s; the heating temperature is 660° C., and the induction heating time is 38 s; the soaking temperature is 770° C., and the soaking time is 3 s; the cooling temperature is 600° C., and the cooling time is 11 s; and the holding temperature is low so that a certain cold-rolled structure retains, strengthening the substrate.

Figure 1:
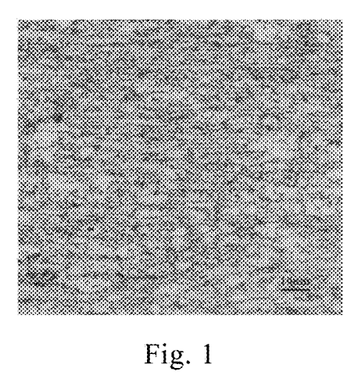
FIG. 1 is a metallograph of a steel substrate of Example 1 of the present invention.

5) aluminium-zinc-hot-dipping, wherein the hot-dipped aluminium-zinc metal layers on both sides are controlled to a weight of 150 g/m$^2$, with the components of the dipping layer being, in weight percentage: 48% of Al, 50% of Zn, 1% of Si, 0.01% of Ti, and the balance being impurities; the temperature of the strip steel when entering the zinc pot is controlled at 600° C. and the temperature of an aluminium zinc liquid is controlled at 580° C.; the cooling after hot-dipping method is cold-gas jet cooling; a rapid cooling method is used, and the substrate is an uniform complex phase structure of ferrite+cementite+bainite+martensite+ some deformed banded grains+fine precipitates (see FIG. 1);

6) skin pass rolling, withdrawing-straightening and coiling for use;

7) optionally Colour-coating, wherein the final product has a thickness of 0.6 mm.

After test detection, the yield strength RP$_{0.2}$ is 640 MPa, the tensile strength Rm is 678 MPa, and the elongation after fracture A80 mm is 13.5%.

Example 2

This example relates to a method for manufacturing an aluminium-zinc-hot-dipped and colour-coated steel plate having a 600 MPa yield strength grade and a high elongation, with the steel plate having a thickness of 0.8 mm after being colour-coated, the method comprising the steps of:

1) smelting: performing molten iron desulphurization, converter smelting and casting to obtain a cast slab having chemical components in weight percentage: 0.08% of C, 0.05% of Si, 1.7% of Mn, 0.0018% of N, 0.006% of S, 0.001% of Ti, 0.045% of Nb, and the balance of Fe and other inevitable impurities;

2) hot-rolling and Pickling wherein the heating tapping temperature is 1220° C., the finish rolling temperature of hot rolling is 850° C. and the hot rolling coiling temperature is 600° C. Water quenching cooling is carried out before coiling; and the hot-rolled plate has a thickness of 2.0 mm;

3) cold-rolling, wherein the overall reduction rate is controlled to 62%, and the cold-rolled plate has a thickness of 0.76 mm; and a lower reduction can increase the recrystallization temperature and increase the recrystallization completion time, and with this process, a certain cold-rolled structure retains, strengthening the substrate.

Figure 2:
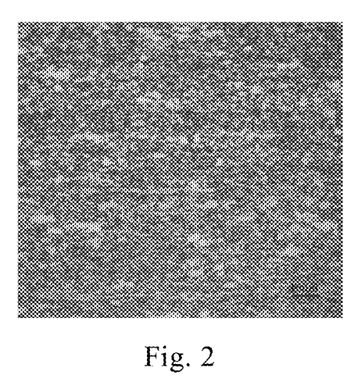
FIG. 2 is a metallograph of a steel substrate of Example 2 of the present invention.

4) continuous annealing performing continuous annealing in a non-oxidation continuous annealing furnace comprising a direct-fired heating section, a radiant tube heating section, a soaking treatment and a cooling treatment, wherein the duration in the direct-fired heating section is 32 s; the heating temperature is 700° C., and the induction heating time is 44 s; the soaking temperature is 820° C., and the soaking time is 4 s; and the cooling temperature is 590° C., and the cooling time is 12 s;

5) aluminium-zinc hot-dipping wherein the hot-dipped aluminium-zinc metal layers on both sides are controlled to a weight of 150 g/m$^2$, with the components of the dipping layer being, in weight percentage: 54% of Al, 44% of Zn, 1% of Si and 0.01% of Ti; and the temperature of the strip steel when entering the zinc pot is controlled at 600° C. and the temperature of an aluminium zinc liquid is controlled at 590° C. The cooling after hot-dipping is gas-mist jet cooling. A rapid cooling method is used, and the substrate is a uniform complex phase structure of ferrite+cementite+a small amount of bainite+a small amount of martensite+a small amount of deformed banded grains+fine precipitates (see FIG. 2);

6) skin pass rolling, withdrawing-straightening and coiling for use;

7) colour-coating. The final product has a thickness of 0.8 mm.

After test detection, the yield strength RP$_{0.2}$ is 627 MPa, the tensile strength Rm is 711 MPa, and the elongation after fracture A80 mm is 13.5%.

Example 3

This example relates to a method for manufacturing an aluminium-zinc-hot-dipped and colour-coated steel plate having a 600 MPa yield strength grade and a high elongation, with the steel plate having a thickness of 0.75 mm after being colour-coated, the method comprising the steps of:

1) smelting: performing molten iron desulphurization, converter smelting and casting to obtain a cast slab having chemical components in weight percentage: 0.15% of C, 0.3% of Si, 1.4% of Mn, 0.0031% of N, 0.01% of S, 0.087% of Ti, 0.011% of Nb, and the balance of Fe and other inevitable impurities;

2) hot-rolling and pickling wherein the heating tapping temperature is 1230° C., the finish rolling temperature of hot rolling is 880° C. and the hot rolling coiling temperature is 650° C.; water quenching cooling is carried out before coiling; and the hot-rolled plate has a thickness of 2.6 mm;

3) cold-rolling, wherein the overall reduction rate is controlled to 71%, and the cold-rolled plate has a thickness of 0.72 mm; the reduction is proper.

Figure 3:
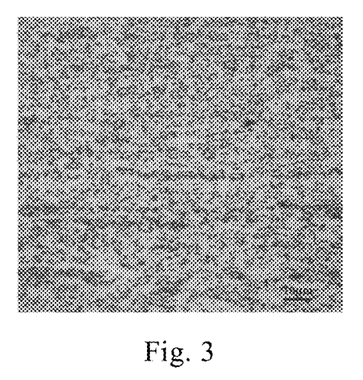
FIG. 3 is a metallograph of a steel substrate of Example 3 of the present invention.

4) continuous annealing performing continuous annealing in a non-oxidation continuous annealing furnace comprising a direct-fired heating section, a radiant tube heating section, a soaking treatment and a cooling treatment, wherein the duration in the direct-fired heating section is 31 s; the heating temperature is 680° C., and the induction heating time is 42 s; the soaking temperature is 780° C., and the soaking time is 4 s; and the cooling temperature is 600° C., and the cooling time is 11 s;

5) aluminium-zinc hot-dipping wherein the hot-dipped aluminium-zinc metal layers on both sides are controlled to a weight of 150 g/m$^2$, with the components of the dipping layer being, in weight percentage: 52% of Al, 45% of Zn, 2% of Si and 0.05% of Ti; the temperature of the strip steel when entering the zinc pot is controlled at 600° C. and the temperature of an aluminium zinc liquid is controlled at 600° C.; the cooling after hot-dipping is gas-mist jet cooling; and a rapid cooling method is used, and the substrate is an uniform complex phase structure of ferrite+cementite+bainite+martensite+deformed banded grains+fine precipitates (see FIG. 3);

6) skin pass rolling, withdrawing-straightening and coiling for use; and 7) colour-coating; wherein the final product has a thickness of 0.75 mm.

After test detection, the yield strength RP$_{0.2}$ is 619 MPa, the tensile strength Rm is 702 MPa, and the elongation after fracture A80 mm is 13.4%.

Example 4

This example relates to a method for manufacturing an aluminium-zinc-hot-dipped and colour-coated steel plate having a 600 MPa yield strength grade and a high elongation, with the steel plate having a thickness of 0.7 mm after being colour-coated, the method comprising the steps of:

1) smelting: performing molten iron desulphurization, converter smelting and casting to obtain a cast slab having chemical components in weight percentage: 0.10% of C, 0.2% of Si, 1.6% of Mn, 0.001% of N, 0.009% of S, 0.17% of Ti, 0.001% of Nb, and the balance being Fe and other inevitable impurities;

2) hot-rolling and pickling wherein the heating tapping temperature is 1170° C., the finish rolling temperature of hot rolling is 890° C. and the hot rolling coiling temperature is 630° C., wherein water quenching cooling is carried out before coiling, and the hot-rolled plate has a thickness of 1.95 mm;

3) cold-rolling, wherein the overall reduction rate is controlled to 66%, and the cold-rolled plate has a thickness of 0.66 mm;

4) continuous annealing performing continuous annealing in a non-oxidation continuous annealing furnace comprising a direct-fired heating section, a radiant tube heating section, a soaking treatment and a cooling treatment. The duration in the direct-fired heating section is 31 s; the heating temperature is 680° C., and the induction heating time is 42 s; the soaking temperature is 835° C., and the soaking time is 3 s; and the cooling temperature is 560° C., and the cooling time is 11 s;

5) aluminium-zinc-hot-dipping, wherein the hot-dipped aluminium-zinc metal layers on both sides are controlled to a weight of 150 g/m², with the components of the dipping layer being, in weight percentage: 51% of Al, 47% of Zn, 1% of Si, 0.02% of Ti, and the balance being impurities; the temperature of the strip steel when entering the zinc pot is controlled at 560° C. and the temperature of an aluminium zinc liquid is controlled at 580° C.; the cooling after hot-dipping is cold-gas jet cooling; a rapid cooling method is used, and the substrate is an uniform complex phase structure of ferrite+cementite+bainite+martensite+some deformed banded grains+fine precipitates;

6) skin pass rolling, withdrawing-straightening and coiling for use;

7) optionally Colour-coating, wherein the final product has a thickness of 0.7 mm.

After test detection, the yield strength $RP_{0.2}$ is 623 MPa, the tensile strength Rm is 708 MPa, and the elongation after fracture A80 mm is 14.5%.

Example 5

This example relates to a method for manufacturing an aluminium-zinc-hot-dipped and colour-coated steel plate having a 600 MPa yield strength grade and a high elongation, with the steel plate having a thickness of 0.7 mm after being colour-coated, the method comprising the steps of:

1) smelting: performing molten iron desulphurization, converter smelting and casting to obtain a cast slab having chemical components in weight percentage: 0.13% of C, 0.09% of Si, 1.5% of Mn, 0.004% of N, 0.008% of S, 0.001% of Ti, 0.051% of Nb, and the balance of Fe and other inevitable impurities;

2) hot-rolling and Pickling
wherein the heating tapping temperature is 1190° C., the finish rolling temperature of hot rolling is 840° C. and the hot rolling coiling temperature is 590° C., wherein water quenching cooling is carried out before coiling, and the hot-rolled plate has a thickness of 2.03 mm;

3) cold-rolling, wherein the overall reduction rate is controlled to 70%, and the cold-rolled plate has a thickness of 0.61 mm;

4) continuous annealing
performing continuous annealing in a non-oxidation continuous annealing furnace comprising a direct-fired heating section, a radiant tube heating section, a soaking treatment and a cooling treatment. The duration in the direct-fired heating section is 46 s; the heating temperature is 680° C., and the induction heating time is 48 s; the soaking temperature is 760° C., and the soaking time is 7 s; the cooling temperature is 600° C., and the cooling time is 11 s; the holding temperature is low so that a certain cold-rolled structure retains, strengthening the substrate.

5) aluminium-zinc-hot-dipping, wherein the hot-dipped aluminium-zinc metal layers on both sides are controlled to a weight of 150 g/m², with the components of the dipping layer being, in weight percentage: 52% of Al, 46% of Zn, 1% of Si, 0.03% of Ti, and the balance being impurities; the temperature of the strip steel when entering the zinc pot is controlled at 600° C. and the temperature of an aluminium zinc liquid is controlled at 600° C.; the cooling after hot-dipping is cold-gas jet cooling; a rapid cooling method is used, and the substrate is an uniform complex phase structure of ferrite+cementite+bainite+martensite+some deformed banded grains+fine precipitates;

6) skin pass rolling, withdrawing-straightening and coiling for use;

7) optionally colour-coating, wherein the final product has a thickness of 0.65 mm.

After test detection, the yield strength $RP_{0.2}$ is 641 MPa, the tensile strength Rm is 685 MPa, and the elongation after fracture A80 mm is 13.2%.

Example 6

This example relates to a method for manufacturing an aluminium-zinc-hot-dipped and colour-coated steel plate having a 600 MPa yield strength grade and a high elongation, with the steel plate having a thickness of 0.7 mm after being colour-coated, the method comprising the steps of:

1) smelting: performing molten iron desulphurization, converter smelting and casting to obtain a cast slab having chemical components in weight percentage: 0.12% of C, 0.09% of Si, 1.5% of Mn, 0.004% of N, 0.008% of S, 0.04% of Ti, 0.035% of Nb, and the balance of Fe and other inevitable impurities;

2) hot-rolling and pickling
wherein the heating tapping temperature is 1160° C., the finish rolling temperature of hot rolling is 810° C. and the hot rolling coiling temperature is 510° C., wherein water quenching cooling is carried out before coiling, and the hot-rolled plate has a thickness of 2.35 mm;

3) cold-rolling, wherein the overall reduction rate is controlled to 72%, and the cold-rolled plate has a thickness of 0.66 mm;

4) continuous annealing
performing continuous annealing in a non-oxidation continuous annealing furnace comprising a direct-fired heating section, a radiant tube heating section, a soaking treatment and a cooling treatment. The duration in the direct-fired heating section is 31 s; the heating temperature is 680° C., and the induction heating time is 42 s; the soaking temperature is 780° C., and the soaking time is 3 s; and the cooling temperature is 585° C., and the cooling time is 11 s; the holding temperature is low so that a certain cold-rolled structure retains, strengthening the substrate.

5) aluminium-zinc-hot-dipping, wherein the hot-dipped aluminium-zinc metal layers on both sides are controlled to a weight of 150 g/m², with the components of the dipping layer being, in weight percentage: 51% of Al, 47% of Zn, 1% of Si, 0.03% of Ti, and the balance being impurities; the temperature of the strip steel when entering the zinc pot is controlled at 585° C. and the temperature of an aluminium zinc liquid is controlled at 550° C.; the cooling after hot-dipping is cold-gas jet cooling; a rapid cooling method is used, and the substrate is an uniform complex phase structure of ferrite+cementite+bainite+martensite+some deformed banded grains+fine precipitates;

6) skin pass rolling, withdrawing-straightening and coiling for use;

7) optionally colour-coating, wherein the final product has a thickness of 0.7 mm.

After test detection, the yield strength $RP_{0.2}$ is 611 MPa, the tensile strength Rm is 680 MPa, and the elongation after fracture A80 mm is 14.2%.

The invention claimed is:
1. An aluminum-zinc-hot-dipped steel plate having a yield strength of ≥600 MPa and a high elongation, wherein the steel plate comprises chemical components (in mass per- centage) consisting of: 0.07-0.15% of C, 0.02-0.5% of Si, 1.3-1.8% of Mn, N≤0.004%, S≤0.01%, Ti≤0.20%, Nb≤0.060%, and the balance being Fe and other inevitable impurities, wherein said chemical components satisfy formulae provided as follows:

(C+Mn/6)≥0.3%;
Mn/S≥150;
0.01%≤(Nb−0.22C−1.1 N)≤0.06%;
0.5≤Ti/C≤1.5; and
0.04%≤(Ti+Nb)≤0.26%; and wherein the steel plate's microstructure is a complex phase structure consisting of ferrite, cementite, bainite, martensite, deformed banded grains, and fine precipitates.

2. The aluminum-zinc-hot-dipped steel plate of claim 1, wherein said steel plate has a tensile strength of 650 MPa and an elongation after fracture of ≥12%.

3. The aluminum-zinc-hot-dipped steel plate of claim 2, wherein the aluminum-zinc-hot-dipped steel plate has fine uniform silver-white spangles on its surface.

4. The aluminum-zinc-hot-dipped steel plate of claim 3, wherein the spangles have a grain diameter that is less than 5 mm.

5. The aluminum-zinc-hot-dipped steel plate of claim 1, wherein the aluminum-zinc-hot-dipped steel plate has fine uniform silver-white spangles on its surface.

6. The aluminum-zinc-hot-dipped steel plate of claim 5, wherein the spangles has a grain diameter that is less than 10 mm.

7. A color-coated steel plate manufactured by color-coating the aluminum-zinc hot dipped steel plate of claim 1.

8. The color-coated steel plate of claim 7, wherein the coating layer comprises fluorocarbon, polyester, silicon-modified polyester, highly weather resistant polyester, or polyvinylidene fluoride.

9. A method for manufacturing the aluminum-zinc-hot-dipped steel plate-of claim 1, said method comprising the steps of:

1) smelting and casting the components according to claim 1 to obtain a cast slab;
2) hot-rolling and pickling the cast slab from step 1), wherein the heating tapping temperature is 1150-1280° C., the finish rolling temperature of the hot rolling is 800-900° C. and the hot rolling coiling temperature is 500-650° C.; and the cooling method after the hot rolling is water cooling;
3) cold-rolling to form a steel strip with a rolling reduction of 60-80%;
4) continuous annealing in a non-oxidation continuous annealing aluminum-zinc-hot-dipping furnace comprising a direct-fired heating section, a radiant tube heating section, a soaking section, a cooling section before hot-dipping, a hot tension roller zone and a hot-dipping section, and cooling after hot-dipping, wherein the duration in the direct-fired heating section is 20-60 s, with the heating temperature being 650-710° C.; the duration in the radiant tube heating section is 30-60 s, with the heating temperature being 750-840° C.; the duration in the temperature holding section is 1-10 s, with the soaking temperature being 750-840° C.; the duration in an cooling after hot-dipping section is 8-15 s; the duration in the hot tension roller zone and the hot-dipping section is 8-12 s; and the cooling rate of the cooling after hot-dipping rate is ≥20° C./s;
5) hot-dipping the steel strip in a zinc pot for a hot-dipping treatment to obtain a high-strength low-alloy aluminum-zinc-hot-dipped steel strip, with the components in weight percentage of the hot-dipping liquid being: 48-58% of Al, 40-50% of Zn, 1.0-2.0% of Si, 0.005-0.050% of Ti and the balance being inevitable impurities and the zinc pot temperature being 550-610° C.; and
6) skin pass rolling and withdrawing-straightening the steel strip with a temper rolling ratio being 0.25%±0.2 and a withdrawing-straightening ratio being 0.2%±0.2.

10. The method of claim 9, further comprising step 7): color-coating to obtain a color-coated steel plate, wherein the coating layer comprises fluorocarbon, polyester, silicon-modified polyester, highly weather resistant polyester, or polyvinylidene fluoride.

11. The method of claim 10, wherein, after being color-coated, the coating surface does not have the defects of bubbles, cracks and holidays.

12. The method of claim 9 wherein gas jet cooling or gas-mist jet cooling is used for the cooling after hot-dipping in step 4).

13. The method of claim 9, wherein said steel plate has a tensile strength of ≥650 MPa and an elongation after fracture of ≥12%.

14. The method of claim 9, wherein the aluminum-zinc-hot-dipped steel plate has fine uniform silver-white spangles on its surface.

* * * * *